United States Patent [19]

Kassner

[11] 4,076,661
[45] Feb. 28, 1978

[54] ADHESIVES BASED ON AQUEOUS DISPERSIONS OF BUTADIENE COPOLYMERS, POLYVINYLPYRROLIDONES AND ANIONIC MACROMOLECULAR COMPOUNDS

[75] Inventor: Karl-Heinz Kassner, Dusseldorf, Germany

[73] Assignee: Henkel Kommanditgesellschaft auf Aktien (Henkel KGaA), Dusseldorf-Holthausen, Germany

[21] Appl. No.: 700,890

[22] Filed: Jun. 29, 1976

[30] Foreign Application Priority Data

Jul. 2, 1975 Germany .............................. 2529512

[51] Int. Cl.$^2$ .............................................. C08L 1/28
[52] U.S. Cl. ........................... 260/17 R; 260/29.7 W; 260/29.7 UA; 260/17.4 BB; 428/457; 428/462
[58] Field of Search ...... 260/17 R, 29.7 W, 29.7 UA, 260/29.7 NQ, 29.7 WA, 17.4 BB; 428/457, 462

[56] References Cited

U.S. PATENT DOCUMENTS 3,305,500  2/1967  Downer et al. ..................... 260/17.4
3,652,497  3/1972  Junas et al. ..................... 260/29.7 X
3,923,718  12/1975  Arpin ................................. 260/29.7

OTHER PUBLICATIONS

A.B.I.P.C., vol. 35, No. 8, 6197, Polyvinylpyrrolidone—A Viscosity Modifier for Paper Coatings; Leibowitz et al.
A.B.I.P.C., vol. 45, No. 8, 8811; Latex Composition—, Polysar Ltd.
World Surface Coating Absts., vol. 313 4, PVP—Viscosity Modifier—, Leibowitz et al.
Chem. Absts. 71:142202; Thickened Aqueous Poly(vinylpyrrolidone) Dispersions, Taylor.
Tappi (1965), vol. 48, No. 1, PVPA Viscosity Modifier—Paper Coatings; Leibowitz.

Primary Examiner—Edward M. Woodberry
Attorney, Agent, or Firm—Hammond & Littell

[57] ABSTRACT

An adhesive comprising an aqueous dispersion of butadiene copolymers, polyvinylpyrrolidones and water-soluble macromolecular compounds containing carboxyl groups, having improved adhesive strength and stability to hot water, said adhesive being particularly useful to bond metals to absorbent substrates.

5 Claims, No Drawings

ADHESIVES BASED ON AQUEOUS DISPERSIONS OF BUTADIENE COPOLYMERS, POLYVINYLPYRROLIDONES AND ANIONIC MACROMOLECULAR COMPOUNDS

RELATED ART

It is known to use mixed polymerizates of butadiene, for example with styrene or, alternatively, acrylonitrile, in the form of their aqueous dispersions for the purpose of gluing or bonding a wide variety of materials. The copolymers which have been used for this purpose are, in particular, those which additionally have groups such as carboxyl groups, or the like, which impart adhesion. Unfortunately, however, if such adhesives are used for gluing paper or cardboard to metals, and the laminates formed are exposed to hot water, the glued joint separates after a short period of time.

OBJECTS OF THE INVENTION

An object of the present invention is to provide aqueous adhesives, based on copolymers or mixed polymerizates of butadiene and which contain carboxyl groups, said adhesives having improved adhesive strength, and, particularly, stability relative to hot water.

Another object of the present invention is the development of an adhesive consisting essentially of an aqueous dispersion containing from 20% to 50% by weight of adhesive solids consisting of a mixed polymerizate of butadiene with monomers selected from the group consisting of styrene and acrylonitrile, containing from 0.5% to 3% by weight of the mixed polymerizate of carboxyl groups derived from monomers polymerizable with butadiene, having a further content, based on said mixed polymerizate of a. from 0.5% to 8% by weight of a vinylpyrrolidone compound selected from the group consisting of polyvinylpyrrolidone and water-soluble copolymers of vinylpyrrolidone, and b. from 0.05% to 2% by weight of at least one carboxyl-group-containing, water-soluble, macromolecular compound and its water-soluble salts.

Another object of the present invention is the development of a metal-absorbent substrate laminate laminated with said adhesive.

These and other objects of the invention will become more apparent as the description thereof proceeds.

DESCRIPTION OF THE INVENTION

The present invention relates to adhesives based on an aqueous dispersion of polymers or copolymers of butadiene with styrene or acrylonitrile.

According to the present invention, there is provided an adhesive comprising copolymers or mixed polymerizates of butadiene with styrene or acrylonitrile which also contain conventional adhesion-imparting carboxyl groups in the macromolecule and, based on the content of the solids of the copolymer additionally a. 0.5% to 8% by weight of polyvinylpyrrolidone or water-soluble copolymers of vinylpyrrolidone, and b. 0.05%, to 2.0% by weight of a water-soluble, macromolecular substance containing carboxyl groups, or its water-soluble salts.

More particularly, the present invention relates to an adhesive consisting essentially of an aqueous dispersion containing from 20% to 50% by weight of adhesive solids consisting of a mixed polymerizate of butadiene with isomers selected from the group consisting of styrene and acrylonitrile, containing from 0.5% to 3% by weight of the mixed polymerizate of carboxyl groups derived from monomers polymerizable with butadiene, having a further content, based on said mixed polymerizate of a. from 0.5% to 8% by weight of a vinylpyrrolidone compound selected from the group consisting of polyvinylpyrrolidone and water-soluble copolymers of vinylpyrrolidone, and b. from 0.05% to 2% by weight of at least one carboxyl-group-containing, water-soluble, macromolecular compound and its water-soluble salts; as well as metal-absorbent substrate laminates laminated with said adhesive.

The adhesives in accordance with the invention are based on copolymers or mixed polymerizates of butadiene with styrene or acrylonitrile which contain approximately 0.5% to 3% by weight of carboxyl groups in the molecule. Such copolymers can be produced by polymerization in aqueous dispersions employing butadiene and styrene or acrylonitrile, as well as an unsaturated carboxyl group containing monomer copolymerizable with butadiene, such as acrylic acid, methacrylic acid or maleic acid, as comonomers. It is also possible to incorporate the esters of the said carboxylic acids by polymerization and subsequently to obtain the acids by saponification.

The types of polyvinylpyrrolidone to be used in accordance with the invention should have a K value between approximately 30 and 90. Preferably, however, the K value lies between 80 and 90. The K value is a measurement of polymer molecular weight by a viscosity determination as described by Kirk-Othmer Encyclopedia of Chemical Technology, 2nd Ed., Volume 16 (1968), page 247-8. Furthermore, water-soluble copolymers of vinylpyrrolidone with monomers polymerizable therewith such as, among others, vinyl acetate, vinyl laurage, vinyl stearate, of the same K value are suitable for the purpose in accordance with the invention. The amount of polyvinylpyrrolidone or copolymers of vinylpyrrolidone is to be 0.5% to 8% by weight, based on the solids of the butadiene copolymer content, preferably 1% to 3% by weight.

Furthermore, in accordance with the invention, the adhesives are to contain anionic water-soluble macromolecular substances containing carboxyl groups and their water-soluble salts. Suitable substances are, for example, carboxymethyl cellulose (CMC) or its water-soluble salts, particularly the alkali metal salts. Suitable types of CMC have a viscosity, in accordance with Brookfield, of 6,000 to 25,000 cP at 25° C in a two percent aqueous solution. Furthermore, polyacrylic acids or their alkali salts, as well as polyacrylic acids which are partially cross-linked, are suitable. Furthermore, it is also possible to use alginates and copolymrs of styrene with maleic acid anhydride which are subsequently saponified with sodium hydroxide solutions and converted to a water-soluble form. The amount of these substances containing carboxy groups should be 0.05% to 2% by weight, preferably 0.1% to 0.5% by weight, based on the solids of the butadiene copolymer content.

The amount of solids in the aqueous adhesive dispersions should be approximately 20% to 50% by weight, particularly 25% to 35% by weight. It will be appreciated that it is possible to add to the polybutadiene dispersions containing carboxyl groups, further plastics dispersions suitable for adhesive purposes, such as those based on poly(meth)-acrylic acid esters or polyvinyl acetate.

Further known auxiliary substances, such as pigments or coloring matter, may be added to the dispersions. Suitable pigments are oxides, such as titanium oxide and the like.

The adhesives in accordance with the invention are suitable for the bonding of metals to porous materials which can absorb the water in the adhesive, i.e. so-called absorbent substrates. Paper and cardboard are the most important materials in this respect. Among the metals to be glued, special reference may be made to aluminum and copper which are frequently used in the form of foils. The adhesives can be applied in a conventional manner by means of rollers, nozzles or even by means of brushes and other suitable devices. The use of conventional laminating machines, which are equipped to rapidly discharge the evaporating water, has proved to be successful when effecting the gluing operation mechanically.

The adhesives in accordance with the invention have satisfactory initial adhesion and, when used as laminating adhesives, enable the composite material to be rolled up immediately. The final strength is generally attained after a short storage period of 24 hours up to approximately 3 days. The bond between the paper and metal foils is distinguished by particularly favorable strength upon heating and when exposed to hot water. In addition, paper and polyethylene and polypropylene can be bonded to one another in an adherent and durable manner if the surface of the plastics materials has been pretreated in a conventional manner.

The present invention will now be further described by means of the following Example.

EXAMPLE

A latex of butadiene/styrene having a styrene content of approximately 50% and a carboxyl group content of approximately 1.5% (by incorporating acrylic acid by polymerization) was diluted to a 30% solids content. 1.5% by weight, based on the solid butadiene/styrene copolymerizate, of a polyvinylpyrrolidone having a K value of 90 was added under agitation, and 0.2% by weight, based on the solid butadiene/styrene copolymerizate, of carboxymethyl cellulose in the form of its sodium salt was subsequently added. The sodium salt of the CMC had a viscosity, according to Brookfield, of 20,000 cP at 25° C.

A sodium craft paper of 60 gm/m$^2$ was laminated with a copper foil of 9 $\mu$ thickness on a commercially available laminating machine. The adhesive application was adjusted such that 1.5 gm was applied per m$^2$. A rigid bond was obtained after passing through the drying passage maintained at approximately 90° C.

The samples were stored for 2 days at room temperature and then examined.

It was determined that the sealing strength was 250° C/1 second.

Furthermore, the laminated material was suspended in hot water of 100° C. The test was discontinued, since no delamination phenomena were observed after 30 minutes.

COMPARISON TEST

For the purpose of comparison, the same latex without an addition of polyvinylpyrrolidone and sodium salt of CMC was used to laminate the same materials. It was determined that after 2 days at room temperature, the sealing strength was only 180° C/1 second, and the laminated material was fully delaminated after it had been suspended for 5 minutes in hot water at 100° C.

The preceding specific embodiments are illustrative of the practice of the invention. It is to be understood, however, that other expedients known to those skilled in the art or disclosed herein, may be employed without departing from the spirit of the invention or the scope of the appended claims.

I claim:

1. An adhesive consisting essentially of an aqueous dispersion containing from 20% to 50% by weight of adhesive solids consisting of a mixed polymerizate of butadiene with monomers selected from the group consisting of styrene and acrylonitrile, containing from 0.5% to 3% by weight of the mixed polymerizate of carboxyl groups derived from monomers polymerizable with butadiene, having a further content, based on said mixed polymerizate of
   a. from 1% to 3% by weight of a vinylpyrrolidone compound having a K value of between 30 and 90 selected from the group consisting of polyvinylpyrrolidone and water-soluble copolymers of vinylpyrrolidone, and
   b. from 0.1% to 0.5% by weight of at least one carboxyl-group-containing, water-soluble, macromolecular compound and its water-soluble salts.

2. The adhesive of claim 1 wherein said vinylpyrrolidone compound has a K value of between 80 and 90.

3. The adhesive of claim 1 wherein said carboxyl-group-containing, water-soluble, macromolecular compound is a water-soluble carboxymethyl cellulose having a Brookfield viscosity of from 6,000 to 25,000 cP at 25° C in a two percent aqueous solution and its water-soluble salts.

4. The adhesive of claim 1 wherein said dispersion contains from 25% to 35% by weight of said adhesive solids.

5. The adhesive of claim 1 wherein said vinylpyrrolidone compound is polyvinylpyrrolidone having a K value of between 80 and 90.

* * * * *